US008008882B2

(12) United States Patent
Huang

(10) Patent No.: US 8,008,882 B2
(45) Date of Patent: Aug. 30, 2011

(54) ROTATION SPEED CONTROLLING SYSTEM FOR SHREDDER MOTOR

(75) Inventor: Simon Huang, SanChung (TW)

(73) Assignee: Michilin Prosperity Co., Ltd., Taipei (TW)

( * ) Notice: Subject to any disclaimer, the term of this patent is extended or adjusted under 35 U.S.C. 154(b) by 162 days.

(21) Appl. No.: 11/985,595

(22) Filed: Nov. 16, 2007

(65) Prior Publication Data

US 2009/0128066 A1 May 21, 2009

(51) Int. Cl.
*G05B 5/00* (2006.01)

(52) U.S. Cl. ......................... 318/466; 318/772; 241/225

(58) Field of Classification Search .................. 318/466, 318/468, 443, 445, 461, 772, 779, 778; 241/225, 241/223

See application file for complete search history.

(56) References Cited

U.S. PATENT DOCUMENTS 3,608,837 A * 9/1971 Panning et al. ................. 241/36
4,026,480 A * 5/1977 Meyers ........................... 241/30
4,495,451 A * 1/1985 Barnard ........................ 318/150
4,545,537 A * 10/1985 Kimura et al. .................. 241/36
4,619,407 A * 10/1986 Goldhammer .................. 241/30
4,997,134 A * 3/1991 MacGregor ........................ 241/3
5,146,144 A * 9/1992 Lee .......................... 318/400.11
5,186,398 A * 2/1993 Vigneaux, Jr. .................. 241/33
5,227,710 A * 7/1993 Lewus .......................... 318/781
5,236,138 A * 8/1993 Stangenberg et al. .......... 241/36
5,561,356 A * 10/1996 Nanos ........................... 318/729
6,419,867 B1 * 7/2002 Lang et al. .................... 264/156
6,456,033 B1 * 9/2002 Nishimura .................... 318/773
6,481,652 B2 * 11/2002 Strutz et al. .............. 241/46.013
6,561,444 B1 * 5/2003 Yokomine et al. .............. 241/30

* cited by examiner

*Primary Examiner* — Rina I Duda
(74) *Attorney, Agent, or Firm* — Venable LLP; Stefan J. Kirchanski

(57) ABSTRACT

A system for controlling the rotation speed of a shredder motor is disclosed. It consists of a bridge rectifier circuit, a forward/reverse controlling switch, a motor speed switch, and AC motor coils. By changing a switch, it is possible to activate the following four modes: forward fast, reverse fast, forward slow, and reverse slow. A user can thus operate a shredder at high torque and low rotation speed or high rotation speed and low torque depending on the number of sheets to be shredded.

6 Claims, 1 Drawing Sheet

ROTATION SPEED CONTROLLING SYSTEM FOR SHREDDER MOTOR

BACKGROUND OF THE INVENTION

1. Field of Invention

The invention relates to a shredder and, in particular, to a shredder that allows its user to control the rotation speed of its motor through a switch, thereby achieving optimal shredding efficiency.

2. Related Art

To prevent documents or data from falling in the hands of unauthorized people, one usually destroys them using a shredder. Therefore, shredders have become an indispensable device for both the office and home.

Currently, shredders are designed to operate at a set, average value of motor torque and rotation speed. Since there is only one rotation speed, it is impossible to find an optimal torque for achieving the best shredding efficiency. In other words, a conventional shredder has only a single rotation speed. If a user wants to shred only one or a few sheets of paper, it is not necessary for the shredder motor to use a great amount of torque. Operating at high torque thus becomes a waste in energy.

In order for a shredder to achieve its optimal efficiency, it is imperative to provide a dual-speed motor that can selectively change its output power. The user can then select a high rotation speed and small torque mode for shredding one or a few sheets of paper, or a low rotation speed and large torque mode for shredding a large amount of paper at one time.

SUMMARY OF THE INVENTION

In view of the foregoing, the disclosed system uses a switch to provide four operating modes for the motor. The first is forward fast, where the motor has a low torque output in order to shred a small amount of paper. The second is forward slow, where the motor has a high torque output to shred more pieces of paper. The third is reverse fast, where the motor uses a low torque output to remove a small paper jam. The fourth is reverse slow, where the motor uses a high torque to remove a big paper jam.

To achieve the above objectives, the invention provides a controlling system for the shredder motor that consists of a bridge rectifier circuit, a forward/reverse controlling switch, a motor rotation speed switch, and AC motor coils. Through the switch, the invention provides four operating modes of forward fast, reverse fast, forward slow, and reverse slow. The user can thus select for the shredder to operate in the mode of large torque and low rotation speed or high rotation speed and small torque.

BRIEF DESCRIPTION OF THE DRAWINGS

The invention will become more fully understood from the detailed description given herein below. The following drawings are for illustration only, and thus should not limit the scope of the present invention.

DETAILED DESCRIPTION OF THE INVENTION

Figure 1:
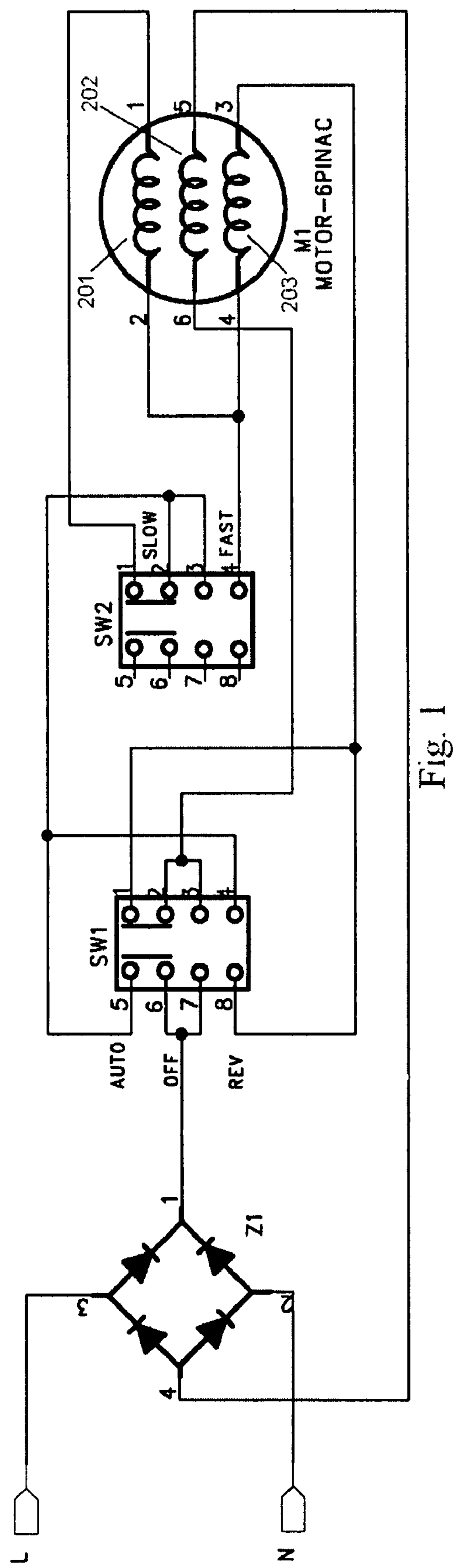
FIG. 1 discloses the controlling circuit diagram for an apparatus embodying features of this invention.

The present invention will be apparent from the following detailed description, which proceeds with reference to the accompanying drawings, wherein the same references relate to the same elements.

Please refer to FIG. 1. In the drawing, Z1 is a bridge rectifier circuit. SW1 is a forward/reverse controlling switch with an on or AUTO position, off position, and reverse position. SW2 is a motor rotation speed switch with a fast and slow position. M1 represents AC motor coils, including the rotor coil 202, the stator coil 203, and the auxiliary low-speed coil 201. This preferred embodiment contains four operating circuits for the following four modes: forward fast, reverse fast, forward slow, and reverse slow.

The first circuit is the forward fast mode. In this mode, the forward/reverse controlling switch SW1 is switched to AUTO and the motor rotation speed switch SW2 is switched to FAST. In this case, the AC current flows through the bridge rectifier Z1 and gets converted into a DC current. The DC current enters the sixth pin of the forward/reverse controlling switch SW1. It is then output via the fifth pin of the forward/reverse controlling switch SW1 to the second pin of the motor rotation speed switch SW2. Afterwards, it is output via the fourth pin of the motor rotation speed switch SW2 to the fourth pin of the AC motor stator coil 203. The current is then output by the third pin of the AC motor stator coil 203 to the first pin of the forward/reverse controlling switch SW1. Afterwards, the current is output from the first pin of the forward/reverse controlling switch SW1 to the sixth pin of the AC motor rotor coil 202. Finally, the current flows via the fifth pin of the AC motor rotor coil 202 back to the bridge rectifier Z1. This completes the circuit for the forward fast mode of the motor.

The second circuit is the reverse fast mode. In this mode, the forward/reverse controlling switch SW1 is switched to REV and the motor rotation speed switch SW2 is switched to FAST. In this case, the AC current flows through the bridge rectifier Z1 and gets converted into a DC current. The DC current enters the seventh pin of the forward/reverse controlling switch SW1 and leaves via the eighth pin of the forward/reverse controlling switch SW1 to the third pin of the AC motor stator coil 203. Afterwards, it is output via the fourth pin of the AC motor stator coil 203 to the fourth pin of the motor rotation speed switch SW2. It is then output via the third pin of the motor rotation speed switch SW2 to the fourth pin of the forward/reverse switch SW1. Afterwards, the current is output by the third pin of the forward/reverse switch SW1 to the sixth pin of the AC motor rotor coil 202. Finally, the current flows from the fifth pin of the AC motor rotor coil 202 back to the bridge rectifier Z1. This completes the circuit for the reverse fast mode of the motor. When the rotation is reversed, the direction of electrical current flowing through the stator coil 203 is opposite to that in the forward mode. On the other hand, the direction of electrical current flowing through the rotor coil 202 is invariant in the forward and reverse modes.

The third circuit is the forward slow mode. In this mode, the forward/reverse controlling switch SW1 is switched to AUTO and the motor rotation speed switch SW2 is switched to SLOW. In this case, the AC current flows through the bridge rectifier Z1 and gets converted into a DC current. The DC current enters the sixth pin of the forward/reverse controlling switch SW1. It is then output via the fifth pin of the forward/reverse controlling switch SW1 to the second pin of the motor rotation speed switch SW2. Afterwards, it is output via the first pin of the motor rotation speed switch SW2 to the first pin of the AC motor auxiliary low-speed coil 201. The current is then output by the second pin of the AC motor auxiliary low-speed coil 201 to the fourth pin of the AC motor stator coil 203. The current is output by the third pin of the AC motor stator coil 203 to the first pin of the forward/reverse controlling switch SW1. Afterwards, the current is output from the second pin of the forward/reverse controlling switch SW1 to the sixth pin of the AC motor rotor coil 202. Finally, the current flows via the fifth pin of the AC motor rotor coil 202 back to the bridge rectifier Z1. This completes the circuit for the forward slow mode of the motor. In the low rotation speed mode, the electrical current flows through the motor rotation speed switch SW2 and enters the low-speed coil set inside the motor. Due to its partial voltage and current restriction, the rotation speed of the motor slows down.

The fourth circuit is the reverse slow mode. In this mode, the forward/reverse controlling switch SW1 is switched to REV and the motor rotation speed switch SW2 is switched to SLOW. In this case, the AC current flows through the bridge rectifier Z1 and gets converted into a DC current. The DC current enters the seventh pin of the forward/reverse controlling switch SW1. It is then output via the eighth pin of the forward/reverse controlling switch SW1 to the third pin of the AC motor stator coil 203. It is then output via the fourth pin of the motor stator coil 203 to the second pin of the AC motor auxiliary low-speed coil 201. The current is then output by the first pin of the AC motor auxiliary low-speed coil 201 to the first pin of the motor rotation speed switch SW2. The current is output by the second pin of the motor rotation speed switch SW2 to the fourth pin of the forward/reverse controlling switch SW1. Afterwards, the current is output from the third pin of the forward/reverse controlling switch SW1 to the sixth pin of the AC motor rotor coil 202. Finally, the current flows via the fifth pin of the AC motor rotor coil 202 back to the bridge rectifier Z1. This completes the circuit for the reverse slow mode of the motor. In the low rotation speed mode, the electrical current flows through the motor rotation speed switch SW2 and enters the low-speed coil set inside the motor. Due to its partial voltage and current restriction, the rotation speed of the motor slows down.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A rotation speed controlling system for a shredder motor comprising:

a bridge rectifier circuit which delivers DC current;

a forward/reverse controlling switch for reversing a direction of DC current flow in the stator coils;

a motor rotation speed switch;

and an electric motor comprising:

a rotor coil energized by DC current from the bridge rectifier;

a first stator coil; and a second auxiliary low-speed stator coil, wherein the torque and speed of the shredder motor is maintained at a higher torque and slower speed when DC current from the bridge rectifier is directed by the motor rotation speed switch through both the first stator coil and the second auxiliary low-speed stator coil and the shredder motor is maintained a lower torque and faster speed when DC current from the bridge rectifier is directed by the motor rotation speed switch through only the first stator coil.

2. The rotation speed controlling system for a shredder motor of claim 1 wherein the shredder motor has at least 2 different speed settings in forward mode.

3. The rotation speed controlling system for a shredder motor of claim 1 wherein the shredder motor has at least 2 different speed settings in reverse mode.

4. The rotation speed controlling system for a shredder motor of claim 1 wherein the shredder motor has operating modes comprised of forward fast and reverse fast which operate at high rotation speed and small torque, and forward slow and reverse slow which operate at large torque and low rotation speed.

5. The rotation speed controlling system for a shredder motor of claim 1 wherein the shredder motor has at least 2 different torque settings in forward mode.

6. The rotation speed controlling system for a shredder motor of claim 1 wherein the shredder motor has at least 2 different torque settings in reverse mode.

* * * * *